Feb. 10, 1953 — I. J. SPAETH — 2,627,947

RAILWAY BRAKE BEAM STRUCTURE

Filed Jan. 28, 1948 — 4 Sheets-Sheet 1

INVENTOR:
IRVIN J. SPAETH
BY Rodney Bedell
ATTORNEY.

Feb. 10, 1953      I. J. SPAETH      2,627,947
RAILWAY BRAKE BEAM STRUCTURE
Filed Jan. 28, 1948      4 Sheets-Sheet 2
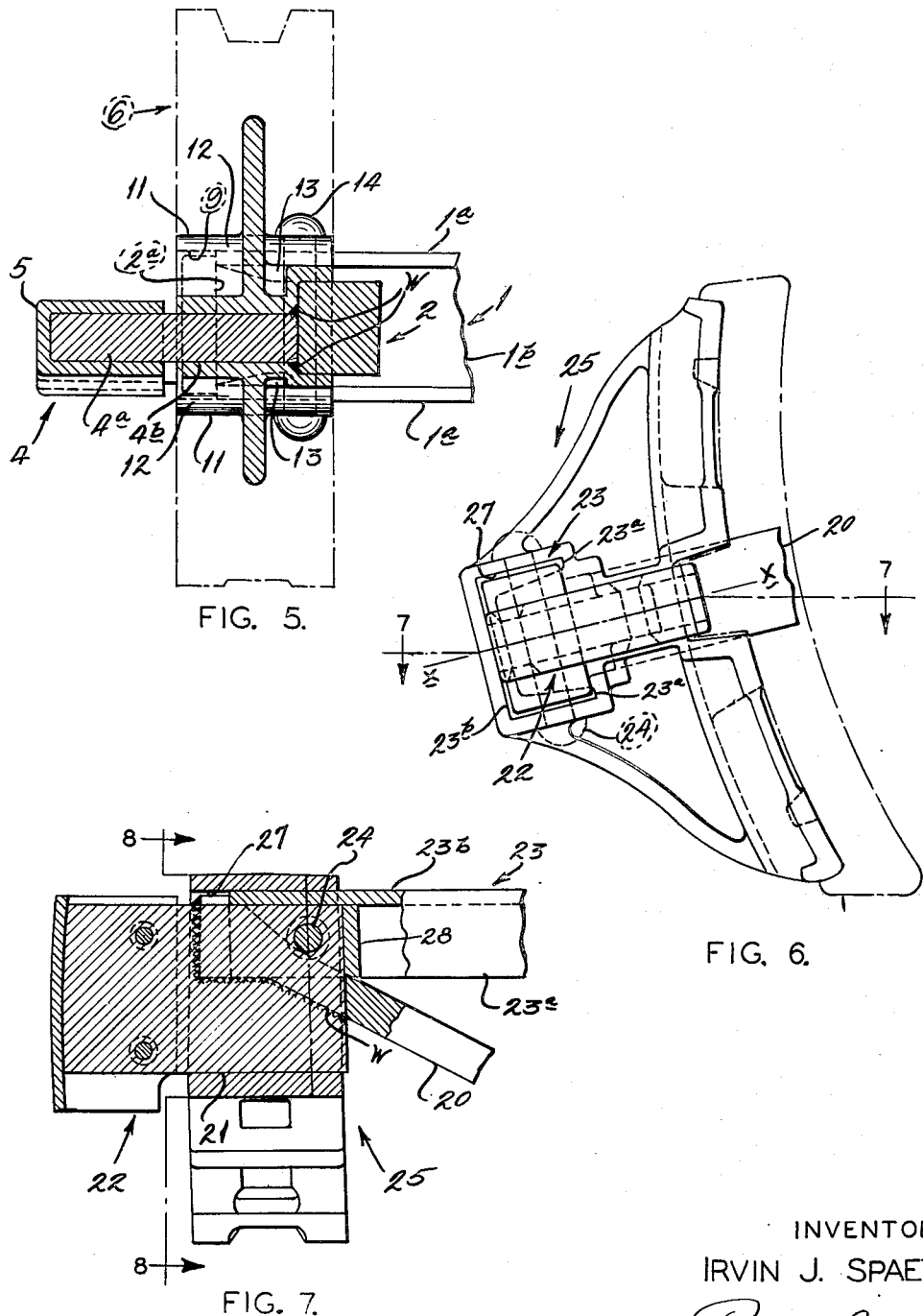
INVENTOR:
IRVIN J. SPAETH
BY Rodney Bedell
ATTORNEY.

Feb. 10, 1953     I. J. SPAETH     2,627,947
RAILWAY BRAKE BEAM STRUCTURE
Filed Jan. 28, 1948     4 Sheets-Sheet 3

INVENTOR:
IRVIN J. SPAETH
BY Rodney Bedell
ATTORNEY.

Feb. 10, 1953 I. J. SPAETH 2,627,947
RAILWAY BRAKE BEAM STRUCTURE
Filed Jan. 28, 1948 4 Sheets-Sheet 4

INVENTOR:
IRVIN J. SPAETH
BY Rodney Bedell
ATTORNEY

Patented Feb. 10, 1953

2,627,947

UNITED STATES PATENT OFFICE 2,627,947

RAILWAY BRAKE BEAM STRUCTURE

Irvin J. Spaeth, Chicago, Ill., assignor to Chicago Railway Equipment Company, Chicago, Ill., a corporation of Illinois Application January 28, 1948, Serial No. 4,738

17 Claims. (Cl. 188—223.1)

The invention relates to railway brake beams of the truss type in which compression and tension members converge near the ends of the beam and mount end structures for carrying brake shoes and for slidably mounting the beam from adjacent brackets on the truck framing.

In one familiar type of brake beam, commonly referred to as the A. A. R. standard, the head is seated on the end of a channel-shaped compression member and the tension rod extends through the head and projects beyond the outer side of the head. A nut is threaded on the end of the tension member and bears against the outer side of the head, thus completing the truss construction. In such a beam, the neutral axis of the tension member intersects the neutral axis of the compression member outwardly of the center line of thrust of the head. At the inner side of the head, the tension member and compression member web are spaced apart transversely of the beam a substantial distance. The truss structure is effective beyond the center line of thrust of the brake head, thus providing a beam of substantial strength.

In another familiar type of brake beam, commonly referred to as the Huntoon type, the tension member of the beam engages the web of the channel-shaped compression member adjacent the inner side of the head and inwardly of the center line of thrust of the head and the end portion of the tension member is bent at an angle to the major portion of the member. A securing device passes through the head and compression member and the bent portion of the tension member, usually passing through the center line of thrust of the head. Since tension member meets the compression member web substantially at the inner side of the head the truss structure is not effective outwardly of the center line of the head and the ultimate strength of such a Huntoon type of beam composed of compression and tension members of the same cross sectional area as the members of an A. A. R. type of beam is substantially less than the A. A. R. type of beam. In the Huntoon type beam, when load is applied, the head pivots rearwardly and is resisted only by the strength of the beam members, whereas in the A. A. R. type beam, the head cannot pivot rearwardly because such movement is resisted by the truss structure also.

One object of the invention is to increase the strength of a Huntoon type brake beam by extending the effective truss beyond the center line of thrust of the brake head as in the A. A. R. type beam.

In the Huntoon type beam, lugs on the ends of the tension member engage the ends of the compression member and it is difficult or impossible to exert uniform pressure on the securing devices and on the tension member ends when load is applied. Either the ends of the tension member or the fastening devices bear the entire load until the load bearing ends or devices wear away sufficiently so both carry the load uniformly. Tests show that the lugs on the tension member frequently crack before the load is equalized and the rivet then carries the entire load.

Another object is to overcome this difficulty by providing for greater flexibility between the brake head, the compression member and the tension member than on the Huntoon type beam.

These and other detail objects as will appear below are attained by the structure described below and illustrated in the accompanying drawings, in which.

Figure 3:
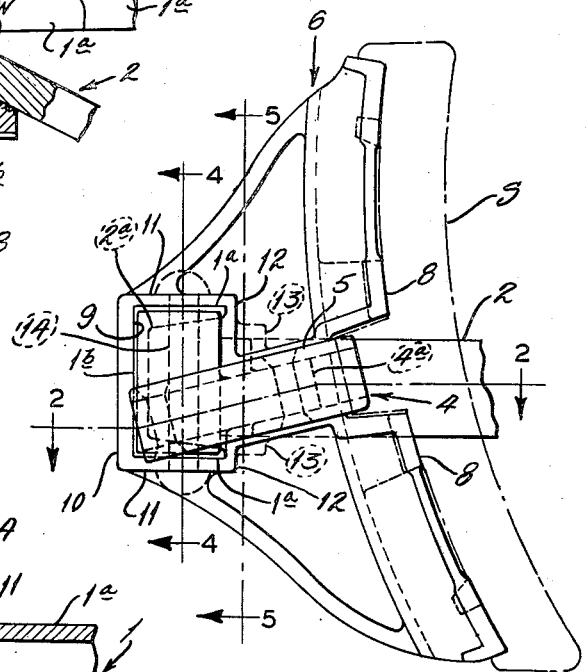
Figure 3 is an end view of the beam.
Figure 4:
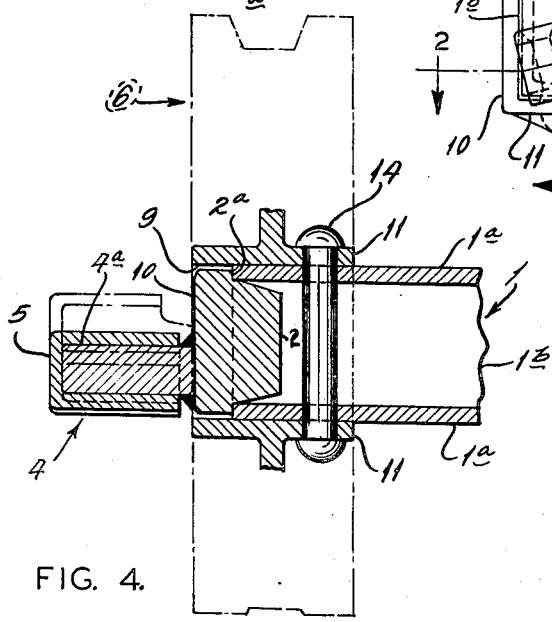

Figures 4 and 5 are longitudinal vertical sections taken approximately on the lines 4—4 and 5—5, respectively, of Figure 3.

Figure 6 is a view similar to Figure 3 but shows another embodiment of the invention.

Figure 7 is a horizontal section taken approximately on the line 7—7 of Figure 6.

Figure 8:
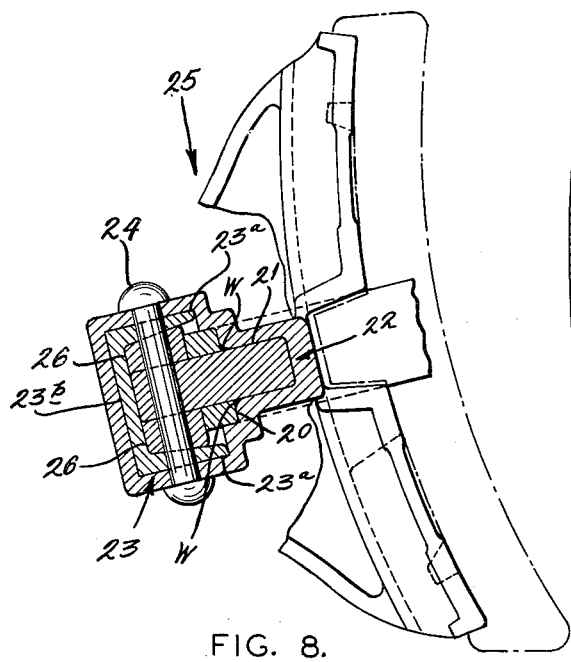

Figure 8 is a transverse vertical section taken approximately on the line 8—8 of Figure 7.

Figure 2:
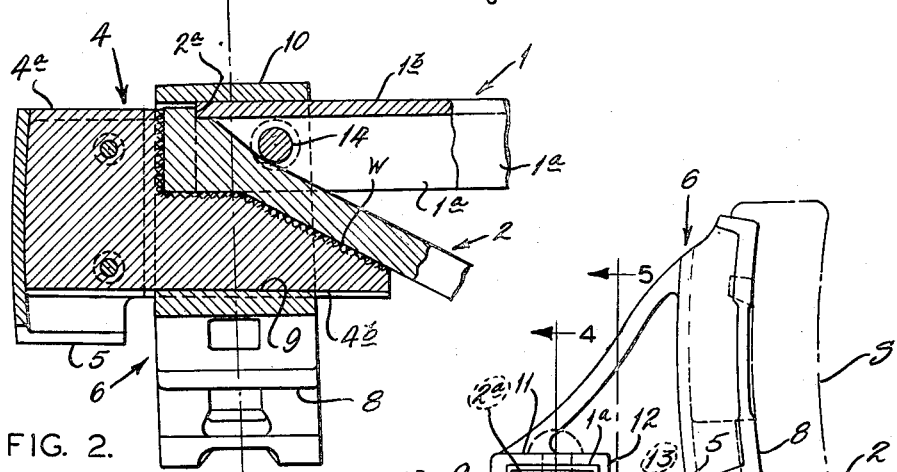
Figure 2 is a horizontal section through the lefthand end of the beam and taken approximately on the line 2—2 of Figure 3.
Figure 9:
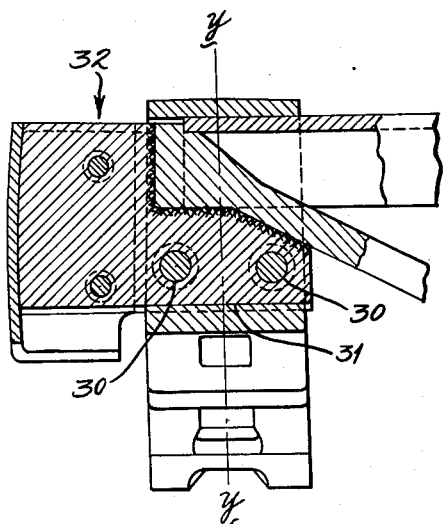
Figure 10:
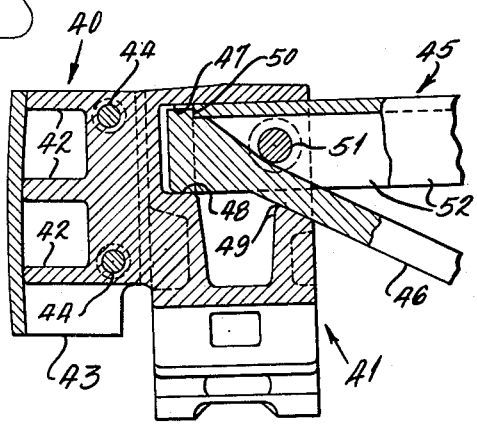
Figure 11:
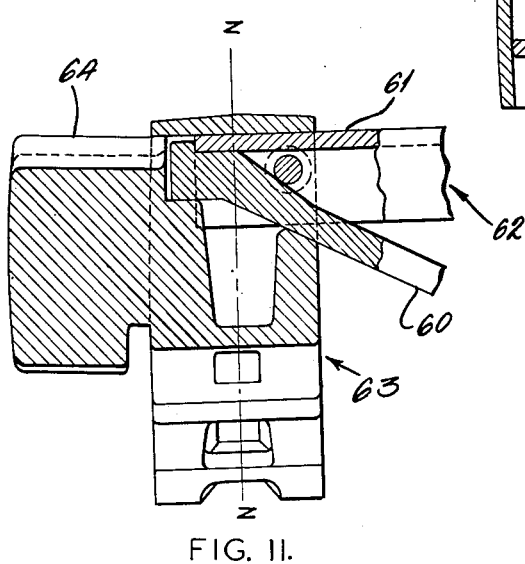

Figures 9, 10 and 11 are views similar to Figure 2 and show other forms of the invention.

Figure 12:
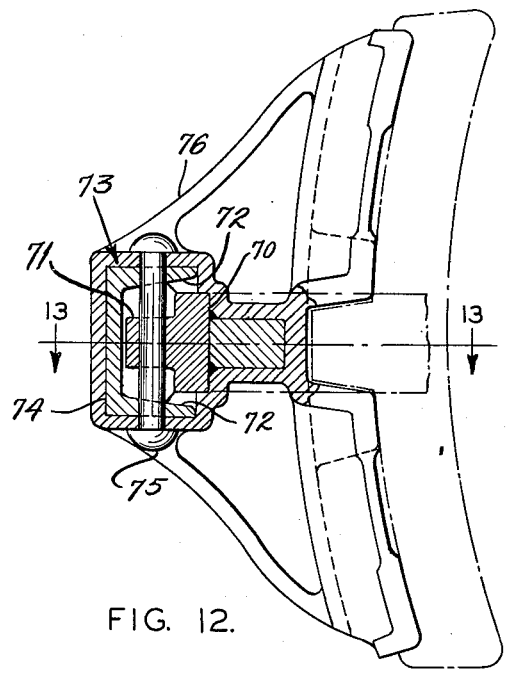
Figure 13:
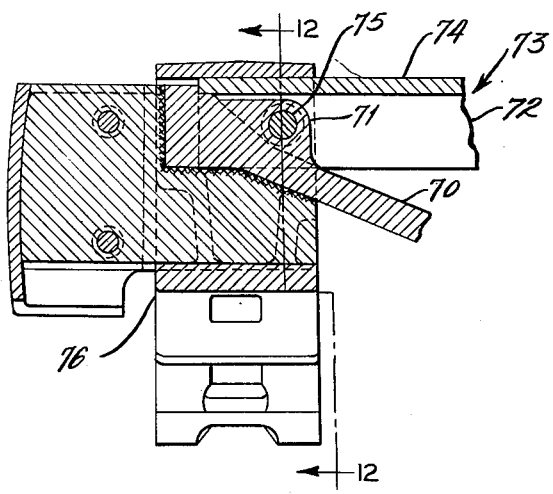

Figure 12 is a transverse vertical section taken approximately on line 12—12 of Figure 13 and shows another form of the invention.

Figure 13 is a horizontal section taken approximately on the line 13—13 of Figure 12.

The brake beam shown in Figures 1-5 includes a compression member 1 of channel-shaped cross section, a tension member 2 of rectangular cross section, and a strut 3 intermediate the ends of the beam. The adjacent end portions of the compression and tension members converge, each end portion of the tension member being received between the compression member flanges 1a and engaging the inner face of the compression member web 1b. A lip 2a on the end of the tension member is seated against the end of the compression member web and flanges. The compression member 1, tension member 2 and strut 3 are positioned substantially in a horizontal plane.

A part 4 at each end of the beam is inclined to the plane of the tension and compression members and has an outer extension 4a for slidably mounting the beam from an adjacent bracket (not shown) on the truck framing and has an inner section 4b welded at W to the end portion of tension member 2. Outer extension 4a is provided with a wear plate 5 riveted thereto.

A brake head 6 is mounted on each end of the beam and includes forwardly projecting lugs 8 for mounting a brake shoe S. A passage 9 extends from side to side through the brake head and receives the end portions of the tension and compression members and inner section 4b which extends through the brake head. The back wall 10 of the passage engages web 1b of the compression member and the top and bottom walls 11 of the passage engage the compression member flanges 1a. The front wall of the passage is offset at 12 to engage the forward edges of flanges 1a of the compression member and is offset at 13 to engage the forward face of the tension member. The forward portion of passage 9 is inclined to the horizontal and closely surrounds the forward portion of inner extension 4b.

A tension member meets and engages the compression member web 1b outwardly of the beam beyond the center line of thrust of the brake head, indicated in Figure 2 by the dot-dash line w—w, and substantially at the end of the compression member. The tension member extends in substantially a straight line from strut 3 at the middle of the beam to the extreme end of the compression member free of any bend between the strut and the end of the beam and the width of the truss at the inner side of the brake head is greater than the width of the compression member. A vertically disposed rivet 14, positioned adjacent and preferably in contact with tension member 2 and inwardly of the center line of thrust w—w, passes through brake head top and bottom walls 11 and compression member flanges 1a.

This construction provides a substantially straight pull from the end of the compression member along the tension member and eliminates the tendency to straighten out the bend in the tension member at the head as in the ordinary Huntoon type beam in which the tension member meets the compression member web adjacent the inner side of the head and then extends parallel with the compression member through the head, which arrangement has been customary heretofore to accommodate the securing rivet extending substantially through the center of the head and through the compression and tension members. The truss structure is effective beyond the center line of thrust of the brake head and substantially to the end of the compression member so that the ultimate load carrying capacity of the present beam is increased considerably over the ordinary Huntoon type. By using a single rivet which passes through the head and compression member only weakening of the tension member by the rivet is avoided and the beam is more flexible than beams used heretofore and provides for small relative movement between the brake head, th tension member and the compression member so that the brake shoe may align itself to the wheel tread.

The brake beam shown in Figures 6, 7 and 8 is similar to the beam shown in Figures 1–5 except that each end portion of tension member 20 is bifurcated to receive inner section 21 of part 22 which extends between flanges 23a and engages web 23b of compression member 23. Part 22 is welded to tension member 20 at W. A U-shaped spacer 28 at the inner side of the brake head has extending into brake head 25. Legs 26 straddle inner section 21 and are positioned between inner section 21 and flanges 23a and between the end portion of tension member 20 and web 23b. A vertically disposed rivet 24 passes through brake head 25, flanges 23a, spacer legs 26 and inner section 21 and is positioned adjacent the bifurcated end portion of the tension member.

The brake head is symmetrical about the axis x—x (Figure 6) and may be applied interchangeably to either end of the beam. The tension and compression members are positioned in a plane parallel to part 22 so that passage 27 in the brake head receiving the adjacent end portions of the tension and compression members and inner section 21 may be formed symmetrically about axis x—x.

The brake beam shown in Figure 9 is similar to the beam shown in Figures 1–5 except that instead of a single rivet extending through the compression member and brake head, a pair of vertically disposed rivets 30, positioned at each side of the center line of thrust y—y of the brake head, pass through the brake head and through inner section 31 of part 32. With the arrangement, the brake head and the tension member are rigid with one another and relative movement between the compression member and the brake head and tension member is provided.

The brake beam shown in Figure 10 is similar to the beam shown in Figures 1–5 except that support part 40 is integral with brake head 41 and comprises a plurality of outwardly extending webs 42 and a wear plate 43 secured thereto by rivets 44. The end portions of compression member 45 and tension member 46 are received in a recess 47 in the brake head. The front wall of recess 47 is offset at 48 and 49 and the offsets engage the tension member 46 and maintain a lip 50 on the tension member in engagement with the end of the compression member. A rivet 51 through the brake head and through compression member flanges 52 maintains assembly of the beam.

The brake beam shown in Figure 11 is similar to the beam shown in Figure 10 except that tension member 60 meets and engages web 61 of compression member 62 substantially at the center line of thrust z—z of brake head 63. Part 64, rigid with head 63, is of solid construction.

The brake beam shown in Figures 12 and 13 is similar to the beam shown in Figures 1–5 except that the tension member 70 has a lug 71 extending between flanges 72 of compression member 73 and spaced from web 74 of the compression member. A vertically disposed rivet 75 extends through brake head 76, flanges 72 of compression member 73 and lug 71 on tension member 70.

Figure 1:
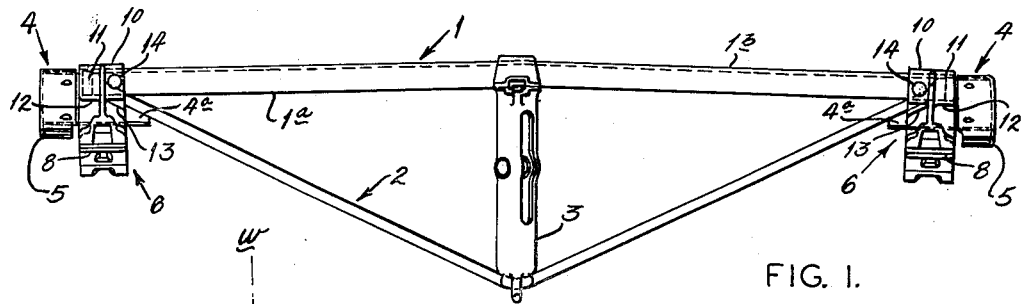
Figure 1 is a top view of a truss type brake beam embodying the invention.

The inner section of each of the supporting parts in Figures 6–8, 9 and 12–13 may be extended inwardly of the beam substantially beyond the brake head as in Figure 1 to provide additional welding between the inner section and the associated tension member.

The details of construction may be varied otherwise than as described without departing from the spirit of the invention and the exclusive use of those modifications coming within the scope of the claims is contemplated.

What is claimed is:

1. In a railway truss type brake beam, a compression member and a tension member with their adjacent end portions converging and interengaging, a brake head mounted on said end portions and maintaining interengagement of said end portions, said members meeting and engaging each other between the center line of thrust of said head and the end of said compression member, and a securing device extending substantially vertically through said head and through said compression member end portion and positioned against said tension member end portion and between the center line of thrust and the inner side of said head.

2. In a railway truss type brake beam, a channel-shaped compression member and a tension member with their adjacent end portions converging and interengaging, and a brake head mounted on associated end portions and maintaining interengagement of said end portions, said compression member including a substantially vertical web and horizontal flanges extending transversely therefrom, and said tension member end portions extending between said flanges and meeting the forward face of said web at a point at least as far from the middle of the beam as the center line of thrust of said head, and a securing device extending substantially vertically through said head and through said compression member flanges and positioned against said tension member and wholly inwardly of the center line of thrust of said head.

3. In a railway truss type brake beam, a compression member and a tension member with their adjacent end portions converging and interengaging, a part adapted to engage an adjacent support bracket and secured directly to said tension member end portion, and a brake head having a passage receiving the adjacent end portions and said part and maintaining interengagement of said end portions.

4. In a railway truss type brake beam, a compression member and a tension member with their adjacent end portions converging and interengaging, a part adapted to engage an adjacent support bracket and secured directly to said tension member end portion, a brake head having a passage receiving the adjacent end portions and a portion of said part and maintaining interengagement of said end portions, and a securing device extending substantially vertically through said brake head and through at least one of said portions.

5. In a railway truss type brake beam, a compression member and a tension member with their adjacent end portions converging and interengaging, a brake head mounted on the associated end portions and maintaining interengagement of said end portions and including elements for mounting a brake shoe, and a part having an extension for slidingly mounting the beam on an adjacent support bracket and having an inner section extending through the brake head and secured to the tension member independently of the brake head.

6. In a railway truss type brake beam, a compression member and a tension member with their adjacent end portions converging and interengaging, a part having an extension for slidably mounting the beam on an adjacent support bracket and having an inner section secured directly to said tension member end portion, a brake head having a passage receiving said end portions and said inner section and maintaining said end portions in interengagement with one another, and a vertically disposed securing device extending through said brake head and said compression member end portion and positioned adjacent said tension member.

7. In a railway truss type brake beam, a compression member and a tension member with their adjacent end portions converging and interengaging, a part having an extension for slidably mounting the beam on an adjacent support bracket and having an inner section secured directly to said tension member end portion, and a brake head having a passage receiving said end portions and said inner section and maintaining said end portions in interengagement with one another, said members meeting and engaging each other at a point spaced from the middle of the brake beam at least as far as the center line of thrust of said brake head, and a securing device positioned inwardly of the center line of thrust of said brake head and passing through said brake head and said compression member.

8. In a railway truss type brake beam, a channel-shaped compression member and a tension member with their end portions converging and interengaging, a part at each end of the beam having an outer extension for slidably mounting the beam from an adjacent support bracket and having an inner section secured to the associated tension member end portion, said tension member end portions being received in the compression member channel and meeting and engaging the compression member channel web substantially at the ends of said compression member, a brake head at each end of the beam receiving the associated end portions and inner section and maintaining interengagement of said associated end portions, and a securing device extending through each of said brake heads and said compression member flanges.

9. In a railway truss type brake beam, a compression member and a tension member with their adjacent end portions converging and interengaging, said tension member end portion being bifurcated, a part having an inner section extending through the bifurcated end portion of said tension member and having an extension for slidably mounting the beam from an adjacent support bracket, a brake head having a passage receiving said part inner section and said member end portions and maintaining said member end portions in interengagement with one another, and a securing device extending through said brake head, said compression member and said part inner section and positioned adjacent the bifurcated end portion of said tension member.

10. In a railway truss type brake beam, a compression member and a tension member with their adjacent end portions converging and interengaging, a part having an outer extension for slidably mounting the beam from adjacent support brackets and having an inner section secured to said tension member, said tension member end portion being bifurcated and receiving said inner section between its bifurcations, a brake head having a passage receiving said part inner sections and said member end portions and maintaining said member end portions in interengagement with one another, said tension member meeting and engaging said compression member between the end of said compression member and the center line of thrust of said head, and a fastening device extending through said brake head, said compression member and said part inner section and positioned adjacent the bifurcated end portion of said tension member.

11. In a railway truss type brake beam, a compression member and a tension member with their adjacent end portions converging and interengaging, a part having an outer extension for slidably mounting the beam from a support bracket and having an inner section secured to said tension member end portion, a brake head having a passage receiving said end portions and said inner section and maintaining said end portions in interengagement with one another, and a securing device extending through said brake head and through said inner section to maintain assembly of the beam.

12. Structure as described in claim 11 in which the compression and tension member end portions meet and engage each other at a point at least as far from the middle of the beam as the center line of thrust of the brake head.

13. In a railway truss type brake beam, a compression member and a tension member with their adjacent end portions converging, an integral lug on said tension member end portion projecting therefrom toward said compression member, a part having an outer extension for slidably mounting the beam from a support bracket and having an inner section secured to said tension member end portion, a brake head on said end portions, and a securing device extending vertically through said lug, compression member and brake head to maintain assembly of the beam.

14. In a railway truss type brake beam, a channel-shaped compression member including a substantially vertical web and horizontal flanges, a tension member converging from the middle of the beam towards the ends of said compression member, a brake head mounted on adjacent end portions of said members, the corresponding end portion of said tension member extending between the flanges of the compression member and meeting said web at a point at least as far from the middle of the beam as the center line of thrust of said head, there being a lug on the inner side of the corresponding end portion of said tension member extending therefrom between said compression member flanges toward said compression member web, and a securing device extending through said head, compression member flanges and tension member lug.

15. In a railway truss type brake beam, a compression member and a tension member with their adjacent end portions converging, an integral lug on one side of said tension member end portion projecting therefrom towards said compression member, a part for slidably mounting the beam from a support bracket and having an inner section secured to the opposite side of said tension member end portion, a brake head on said end portions and inner section, and a securing device extending through said lug, compression member and brake head to maintain assembly of the beam.

16. In a railway truss type brake beam, a compression member and a tension member with their adjacent end portions converging and interengaging, a part adapted to engage an adjacent support bracket and secured directly to said tension member end portion, and a brake head having a passage receiving the adjacent end portions and said part and maintaining interengagement of said end portions, the compression and tension member adjacent end portions meeting and engaging each other at a point at least as far from the middle of the beam as the center line of thrust of the brake head.

17. In a railway truss type brake beam, a channel-shaped compression member and a tension member with their adjacent end portions converging and interengaging, a part for slidably mounting the beam from an adjacent support bracket and having an inner section secured to said tension member, said tension member end portion being bifurcated and receiving said inner section between its bifurcations, said tension member end portion and said inner section being received in the compression member channel, a brake head having a passage receiving said part inner section and said member end portions and maintaining said member end portions in interengagement with one another, said tension member meeting and engaging the compression member web between the end of said compression member and the center line of thrust of said brake head, a substantially U-shaped spacer with legs straddling said part inner section and positioned at the inner side of said brake head passage between said tension member end portion and said compression member web, and a fastening device extending through said brake head, said compression member, said spacer legs and said part inner section and positioned adjacent the bifurcated end portion of said tension member.

IRVIN J. SPAETH.

REFERENCES CITED

The following references are of record in the file of this patent:

UNITED STATES PATENTS

| Number | Name | Date |
|---|---|---|
| 744,723 | Crone | Nov. 24, 1903 |
| 955,239 | Williams, Jr. | Apr. 19, 1910 |
| 956,616 | Williams, Jr. | May 3, 1910 |
| 979,668 | Haskell | Dec. 27, 1910 |
| 990,938 | Williams, Jr. | May 2, 1911 |
| 996,584 | Hoffman | June 27, 1911 |
| 1,634,995 | Huntoon | July 5, 1927 |
| 2,074,667 | Paterson | Mar. 23, 1937 |
| 2,398,917 | Busch | Apr. 23, 1946 |
| 2,408,015 | Busse | Sept. 24, 1946 |
| 2,419,115 | Busse | Apr. 15, 1947 |